(12) United States Patent
Liu et al.

(10) Patent No.: US 11,638,222 B2
(45) Date of Patent: Apr. 25, 2023

(54) POWER DETERMINING METHOD AND APPARATUS

(71) Applicant: Huawei Technologies Co., Ltd., Shenzhen (CN)

(72) Inventors: Zhe Liu, Beijing (CN); Xingwei Zhang, Lund (SE); Qian Zhang, Beijing (CN); Shulan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/172,385

(22) Filed: Feb. 10, 2021

(65) Prior Publication Data

US 2021/0168735 A1 Jun. 3, 2021

Related U.S. Application Data

(63) Continuation of application No. PCT/CN2019/099414, filed on Aug. 6, 2019.

(30) Foreign Application Priority Data

Aug. 10, 2018 (CN) .......................... 201810912181.3

(51) Int. Cl.
*H04W 52/50* (2009.01)
*H04W 76/16* (2018.01)
*H04W 52/36* (2009.01)

(52) U.S. Cl.
CPC .......... *H04W 52/50* (2013.01); *H04W 52/36* (2013.01); *H04W 76/16* (2018.02)

(58) Field of Classification Search
CPC ..... H04W 52/50; H04W 76/16; H04W 52/36; H04W 52/367; H04W 52/18; H04W 52/146; H04L 5/0092
(Continued)

(56) References Cited

U.S. PATENT DOCUMENTS 10,098,078 B2 * 10/2018 Wang ................... H04W 52/146
10,728,859 B2 * 7/2020 Kim .................... H04W 52/365
(Continued)

FOREIGN PATENT DOCUMENTS

CN 106031256 A 10/2016
CN 106165476 A 11/2016
(Continued)

OTHER PUBLICATIONS

Zte, Offline summary for AI 6.1.7 NR UL power control, R1-1714930, 3GPP TSG RAN WG1 Meeting #90, Prague, Czechia, Aug. 21- 25, 2017, 12 pages.
(Continued)

*Primary Examiner* — John J Lee
(74) *Attorney, Agent, or Firm* — Conley Rose, P.C.

(57) ABSTRACT

A power determining method includes determining first new radio (NR) power based on first additional maximum power reduction (AMPR), where the first AMPR is calculated based on first resource allocation information and NR scheduling information, determining Long-Term Evolution (LTE) power based on second AMPR, where the second AMPR is calculated based on LTE scheduling information and second resource allocation information, and when a sum of the first NR power and the LTE power is greater than maximum transmit power of a terminal device, sending LTE information to the first access device at the LTE power on time domain resources that completely or partially overlap each other, and sending NR information to the second access device at second NR power or skipping sending NR information, where the second NR power is less than the first NR power.

18 Claims, 5 Drawing Sheets

(58) Field of Classification Search
USPC .................. 455/522, 69, 515, 509, 67.11
See application file for complete search history.

(56) References Cited

U.S. PATENT DOCUMENTS

| | | | |
|---|---|---|---|
| 2012/0163202 A1* | 6/2012 | Aguirre .................. | H04L 41/12 370/252 |
| 2012/0178494 A1* | 7/2012 | Haim .................. | H04W 72/082 455/522 |
| 2015/0085760 A1 | 3/2015 | Yamada et al. | |
| 2015/0087352 A1* | 3/2015 | Lim .................. | H04W 52/146 455/522 |
| 2015/0271811 A1 | 9/2015 | Kim et al. | |
| 2015/0334764 A1 | 11/2015 | Rahman et al. | |
| 2015/0358924 A1 | 12/2015 | Papasakellariou | |
| 2017/0019864 A1 | 1/2017 | Hwang et al. | |
| 2018/0014256 A1 | 1/2018 | Yi et al. | |
| 2018/0115957 A1 | 4/2018 | Lin et al. | |
| 2019/0174433 A1* | 6/2019 | Nory .................. | H04W 52/367 |
| 2020/0053665 A1* | 2/2020 | Frank .................. | H04W 52/362 |
| 2020/0154442 A1 | 5/2020 | Zhou | |

FOREIGN PATENT DOCUMENTS

| | | |
|---|---|---|
| CN | 106465295 A | 2/2017 |
| CN | 106465300 A | 2/2017 |
| CN | 103959870 B | 11/2017 |
| CN | 107466486 A | 12/2017 |
| EP | 3142428 A1 | 3/2017 |
| WO | 2017113401 A1 | 7/2017 |
| WO | 2018026165 A1 | 2/2018 |
| WO | 2020031160 A1 | 2/2020 |

OTHER PUBLICATIONS

Catt, "Correction on Power Sharing for EN DC," R1-1800267, 3GPP TSG RAN WG1 Meeting NR Ad Hoc, Vancouver, Canada, Jan. 22-26, 2018, 4 pages.

Ran1, "Reply LS on RAN4 agreement on intraband EN-DC A-MPR," R1-1807974, 3GPP TSG-RAN WG1 Meeting #93, Busan, Korea, May 21-25, 2018, 2 pages.

"3rd Generation Partnership Project; Technical Specification Group Radio Access Network; Evolved Universal Terrestrial Radio Access (E-UTRA); Physical layer procedures (Release 15)," 3GPP TS 36.213 V15.2.0, Jun. 2018, 541 pages.

"3rd Generation Partnership Project; Technical Specification Group Radio Access Network; NR; User Equipment (UE) radio transmission and reception; Part 1: Range 1 Standalone (Release 15)," 3GPP TS 38.101-1, V15.2.0, Jun. 2018, 126 pages.

"3rd Generation Partnership Project; Technical Specification Group Radio Access Network; NR; Physical layer procedures for control (Release 15)," 3GPP TS 38.213 V15.2.0, Jun. 2018, 99 pages.

* cited by examiner

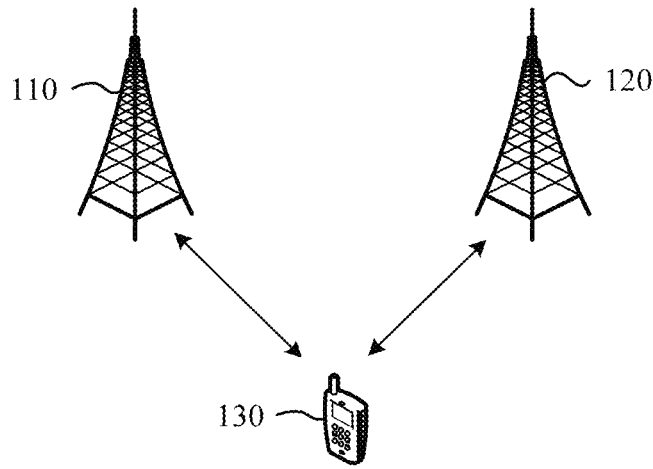

| A terminal device determines first NR power based on first AMPR, where the first AMPR is calculated based on first resource allocation information and NR scheduling information, and the terminal device accesses a first access device by using an LTE access technology, and accesses a second access device by using an NR access technology | — S210 |

| The terminal device determines LTE power based on second AMPR, where the second AMPR is calculated based on LTE scheduling information and second resource allocation information, and the second resource allocation information is a preset value the same as or different from the first resource allocation information | — S220 |

| When a sum of the first NR power and the LTE power is greater than maximum dual connectivity transmit power of the terminal device, the terminal device sends LTE information to the first access device at the LTE power on time domain resources that completely or partially overlap each other, and the terminal device sends NR information to the second access device at second NR power or skips sending the NR information, where the second NR power is less than the first NR power | — S230 |

FIG. 2

POWER DETERMINING METHOD AND APPARATUS

CROSS-REFERENCE TO RELATED APPLICATIONS

This application is a continuation of International Patent Application No. PCT/CN2019/099414 filed on Aug. 6, 2019, which claims priority to Chinese Patent Application No. 201810912181.3 filed on Aug. 10, 2018. The disclosures of the aforementioned applications are hereby incorporated by reference in their entireties.

TECHNICAL FIELD

This application relates to the communications field, and in particular, to a power determining method and an apparatus.

BACKGROUND

A dual connectivity (DC) communications system is a communications system in which two network devices communicate with a terminal device. Compared with a communications system in which carrier aggregation is used, the DC communications system has an advantage that system time of cells corresponding to different network devices is allowed to be asynchronous.

The foregoing two network devices are, for example, a primary base station and a secondary base station. The primary base station may be an evolved NodeB (eNB) in a Long-Term Evolution (LTE) system, and the secondary base station may be a next generation NodeB (gNB) in a new radio (NR) system. In the DC communications system, system time of cells respectively corresponding to the eNB and the gNB is allowed to be asynchronous, and there are different numerologies in NR. Therefore, transmission time periods may overlap in a transmission process performed by the terminal device in the DC communications system including the eNB and the gNB. If the terminal device simultaneously transmits information to the eNB and the gNB in one band (band), transmit power may exceed maximum transmit power of the terminal device, resulting in a communication failure.

SUMMARY

This application provides a power determining method and an apparatus, to avoid a case in which transmit power exceeds maximum DC transmit power when the terminal device sends signals to two access devices.

According to a first aspect, a power determining method is provided. The method includes a terminal device determines first NR power based on first additional maximum power reduction (AMPR). The first AMPR is calculated based on first resource allocation information and NR scheduling information. The terminal device accesses a first access device by using an LTE access technology, and accesses a second access device by using an NR access technology. The terminal device determines LTE power based on second AMPR. The second AMPR is calculated based on LTE scheduling information and second resource allocation information. The second resource allocation information is a preset value. When a sum of the first NR power and the LTE power is greater than maximum transmit power of the terminal device, the terminal device sends LTE information to the first access device at the LTE power on time domain resources that completely or partially overlap each other, and sends NR information to the second access device at second NR power or skips sending NR information. The second NR power is less than the first NR power.

The terminal device calculates the LTE power by using preset resource allocation information (that is, the second resource allocation information), and calculates the first NR power by using preset or real-time resource allocation information. In this way, when calculating the LTE power, the terminal device does not need to obtain the NR scheduling information, so that a communication failure caused because transmit power exceeds the maximum transmit power of the terminal device can be avoided on a premise that a communications protocol (for example, the protocol 38.213) is not violated.

Optionally, the method further includes, when the sum of the first NR power and the LTE power is less than or equal to the maximum DC transmit power of the terminal device, the terminal device sends the NR information to the second access device at the first NR power on the time domain resources that completely or partially overlap each other, and sends the LTE information to the first access device at the LTE power.

Optionally, the first resource allocation information is obtained based on the LTE scheduling information, or the first resource allocation information is a preset value.

For example, when failing to obtain the LTE scheduling information when obtaining the first resource allocation information (that is, calculating resource allocation on an NR side), the terminal device may determine the resource allocation on the NR side based on preset first resource allocation information, and calculate the LTE power based on the resource allocation on the NR side and the first AMPR. In this way, the communication failure caused because the transmit power exceeds the maximum transmit power of the terminal device can be avoided. For another example, when successfully obtaining the LTE scheduling information when obtaining the first resource allocation information (that is, calculating resource allocation on an NR side), the terminal device may obtain the first resource allocation information based on the LTE scheduling information, to more accurately calculate the first NR power.

According to a second aspect, this application further provides a power determining method. The method includes a terminal device determines LTE power based on third AMPR. The third AMPR is calculated based on LTE scheduling information and third resource allocation information. The terminal device accesses a first access device by using an LTE access technology, and accesses a second access device by using an NR access technology. The terminal device sends LTE information at the LTE power.

According to the foregoing solution, the terminal device may obtain the third resource allocation information when calculating the LTE power. The third resource allocation information indicates resource allocation on an NR side. The third resource allocation information may be a preset value, or may be a value obtained in real time, for example, a value obtained from NR scheduling information. In this way, the terminal device can calculate the LTE power based on resource allocation on the NR side, so that a communication failure caused because transmit power exceeds maximum DC transmit power of the terminal device can be avoided.

Optionally, the third resource allocation information is obtained based on the NR scheduling information. The method further includes the terminal device obtains the NR scheduling information at a first moment. The first moment is earlier than or equal to a preset calculation start moment of the LTE power.

If the terminal device obtains the NR scheduling information before the calculation start moment of the LTE power, the terminal device may obtain the third resource allocation information based on the NR scheduling information, and calculate the LTE power. If the terminal device does not obtain the NR scheduling information at the calculation start moment of the LTE power, the terminal device first calculates the LTE power based on preset third resource allocation information. Then, if the terminal device obtains the NR scheduling information at a preset update start moment of the LTE power, the terminal device obtains real-time NR scheduling information based on the NR scheduling information, and recalculates the LTE power. In this way, precision for calculating the LTE power can be improved on a premise that the LTE information is ensured to be sent.

Optionally, the third resource allocation information is obtained based on NR scheduling information. The method further includes the terminal device obtains the NR scheduling information at a second moment. The second moment is later than a preset calculation start moment of the LTE power and is earlier than or equal to a preset update start moment of the LTE power. The terminal device determines, based on the LTE scheduling information and a preset value at the calculation start moment of the LTE power, LTE power that is not updated.

If the terminal device does not obtain the NR scheduling information before the calculation start moment of the LTE power, the terminal device may calculate an AMPR value based on the preset value and the LTE scheduling information, and calculate, based on the AMPR value, the LTE power that is not updated. Then, if the terminal device obtains the NR scheduling information at the preset update start moment of the LTE power, the terminal device obtains real-time third resource allocation information based on the NR scheduling information, and recalculates the LTE power. In this way, precision for calculating the LTE power can be improved on a premise that the LTE information is ensured to be sent.

Optionally, the method further includes the terminal device generates an updated power headroom report (PHR) based on the LTE scheduling information. The second moment is earlier than or equal to a preset update start moment of the PHR. The terminal device generates, before the second moment based on the LTE power that is not updated, a PHR that is not updated. The terminal device sends the updated PHR.

After calculating the LTE power that is not updated, the terminal device may generate the PHR based on the LTE power that is not updated, and report the PHR. If a moment at which the terminal device obtains the NR scheduling information is earlier than or equal to the preset update start moment of the PHR, the terminal device may first calculate updated LTE power based on the NR scheduling information, and then regenerate the PHR based on the updated LTE power, so that precision of the PHR can be improved.

Optionally, the third resource allocation information is a preset value. Before the terminal device sends the LTE information at the LTE power determined based on the preset value, the method further includes the terminal device obtains the NR scheduling information at a third moment. The third moment is later than a preset calculation start moment of the LTE power and a preset update start moment of the LTE power.

If the terminal device obtains the NR scheduling information after the update start moment of the LTE power, there is no time for the terminal device to update the LTE power. The terminal device may transmit a signal at LTE power calculated based on preset third resource allocation information, to ensure that the LTE information can be normally transmitted.

According to a third aspect, this application provides a power determining apparatus. The apparatus may implement functions corresponding to the steps in the method in the first aspect. The functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in executing the corresponding functions in the method in the first aspect. The apparatus may further include a memory. The memory is configured to couple to the processor, and the memory stores a program instruction and data that are necessary to the apparatus. Optionally, the apparatus further includes a communications interface. The communications interface is configured to support communication between the apparatus and another network element.

According to a fourth aspect, this application provides a computer program product. The computer program product includes computer program code. When the computer program code is run by a communications unit and a processing unit, or a transceiver and a processor of a terminal device, the terminal device is enabled to perform the method in the first aspect.

According to a fifth aspect, this application provides a power determining apparatus. The apparatus may implement functions corresponding to the steps in the method in the second aspect. The functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in executing the corresponding functions in the method in the second aspect. The apparatus may further include a memory. The memory is configured to couple to the processor, and the memory stores a program instruction and data that are necessary to the apparatus. Optionally, the apparatus further includes a communications interface. The communications interface is configured to support communication between the apparatus and another network element.

According to a sixth aspect, this application provides a computer program product. The computer program product includes computer program code. When the computer program code is run by a communications unit and a processing unit, or a transceiver and a processor of a terminal device, the terminal device is enabled to perform the method in the second aspect.

BRIEF DESCRIPTION OF DRAWINGS

FIG. 1 is a schematic diagram of a communications system applicable to this application.

FIG. 2 is a schematic diagram of a power determining method according to this application.

DESCRIPTION OF EMBODIMENTS

Figure 3:
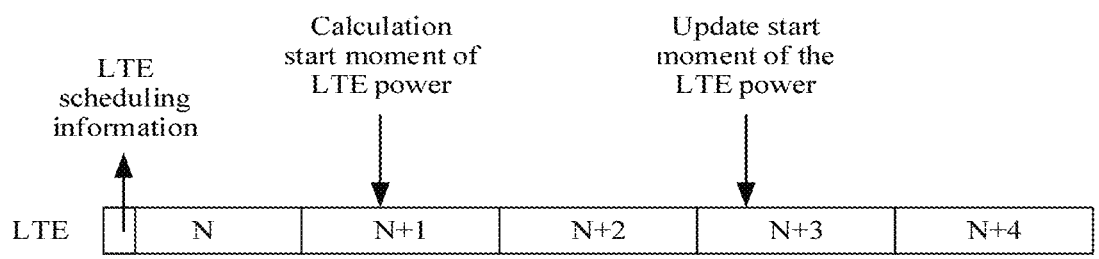
FIG. 3 is a schematic diagram of another power determining method according to this application.

The following describes technical solutions of this application with reference to the accompanying drawings.

FIG. 1 is a schematic diagram of a communications system applicable to this application. As shown in FIG. 1, the communications system may include at least two network devices, for example, a network device 110 and a network device 120 shown in FIG. 1. The communications system may further include at least one terminal device, for example, a terminal device 130 shown in FIG. 1. The terminal device 130 may establish radio links to the network device 110 and the network device 120 by using a DC technology or a multi-connectivity technology. The network device 110 may be, for example, a primary base station, and the network device 120 may be, for example, a secondary base station. In this case, the network device 110 is a network device that is initially accessed by the terminal device 130, and is responsible for Radio Resource Control (RRC) communication with the terminal device 130. The network device 120 may be added during RRC reconfiguration, and is configured to provide an additional radio resource.

Certainly, the network device 120 may alternatively be a primary base station, and the network device 110 may alternatively be a secondary base station. This is not limited in this application. In addition, for ease of understanding only, the figure shows a case in which the two network devices are in wireless connection with the terminal device. However, this should not constitute any limitation on a scenario to which this application is applicable. The terminal device may alternatively establish radio links to more network devices.

A plurality of antennas may be configured for each communications device, such as the network device 110, the network device 120, and the terminal device 130 in FIG. 1. The plurality of antennas may include at least one transmit antenna that is configured to send a signal and at least one receive antenna that is configured to receive a signal. In addition, each communications device may additionally include a transmitter chain and a receiver chain. A person of ordinary skill in the art may understand that, the transmitter chain and the receiver chain each may include a plurality of components (for example, a processor, a modulator, a multiplexer, a demodulator, a demultiplexer, or an antenna) that are related to signal sending and receiving. Therefore, the network device and the terminal device may communicate with each other by using a multiple-antenna technology.

It should be understood that, the network device 110 or the network device 120 may be any device having a wireless transceiver function. The device includes, but is not limited to an eNB, a radio network controller (RNC), a NodeB (NB), a base station controller (BSC), a base transceiver station (BTS), a home base station (for example, a home eNB, or a home NB (HNB)), a baseband unit (BBU), an access point (AP) in a Wi-Fi system, a wireless relay node, a wireless backhaul node, a transmission point (TP), a transmission reception point (TRP), or the like. Alternatively, the device may be a gNB or a TRP or a TP in a fifth generation (5G) system such as an NR system, or an antenna panel or a group (including a plurality of antenna panels) of antenna panels of a base station in a 5G system. Alternatively, the device may be a network node, such as a BBU or a distributed unit (DU), that constitutes a gNB or a transmission point.

In some deployments, the gNB may include a centralized unit (CU) and a DU. The gNB may further include a radio frequency unit (RU). The CU implements a part of functions of the gNB, and the DU implements a part of the functions of the gNB. For example, the CU implements functions of RRC layer and a packet data convergence protocol (PDCP) layer, and the DU implements functions of a radio link control (RLC) layer, a media access control (MAC) layer, and a physical layer (PHY). Information at the RRC layer eventually becomes information at the PHY layer, or the information at the RRC layer is converted from the information at the PHY layer. Therefore, in this architecture, higher layer signaling such as RRC layer signaling may also be considered as being sent by the DU or by the DU and the CU. It may be understood that, the network device may be a CU node, a DU node, or a device including a CU node and a DU node. In addition, the CU may be classified as a network device in a radio access network (RAN), or may be classified as a network device in a core network (CN). This is not limited in this application.

It should further be understood that, the terminal device 130 may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in embodiments of this application may be a mobile phone, a tablet (pad), a computer having the wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this application.

FIG. 2 is a schematic diagram of a power determining method according to this application. The method includes the following steps.

S210. A terminal device determines first NR power based on first AMPR, where the first AMPR is calculated based on first resource allocation information and NR scheduling information, and the terminal device accesses a first access device by using an LTE access technology, and accesses a second access device by using an NR access technology.

In the method 200, to communicate with both the first access device and the second access device, where the first access device is, for example, an eNB, and the second access device is, for example, a gNB, the terminal device includes two functional modules, that is, an LTE unit and an NR unit. The two functional modules may be implemented by using software, or may be implemented by using hardware. This is not limited in this application.

In this application, "first" and "second" are merely used for distinction and description, and should not be understood as a limitation on the technical solutions of this application. The first AMPR is a value determined based on an AMPR mechanism. Correspondingly, the second AMPR is a value that is determined based on the AMPR mechanism and that is the same as or different from the first AMPR. The following describes the AMPR mechanism in an intra-band Evolved Universal Mobile Telecommunications System (UMTS) Terrestrial Radio Access (E-UTRA)-NR DC (EN-DC) with master cell group (MCG) using E-UTRA and secondary cell group (SCG) using NR scenario.

In the existing technical specification (TS) 38.101 protocol, for the intra-band EN-DC scenario, the AMPR mechanism is defined as a fitted curve, obtained under an assumption that power spectral density (PSD) or power is equal on an LTE side and an NR side, of a relationship between the AMPR value and resource block (RB) allocation (or a ratio of a quantity of RBs to a total aggregation band).

In addition, the following describes meanings of technical terms in the method 200.

LTE AMPR (for example, the following second AMPR), the LTE AMPR is determined based on LTE scheduling information, NR resource allocation information, and one or more of a system information block (SIB) message and higher layer signaling. The NR resource allocation information may be an actual value obtained based on the NR scheduling information, or may be a preset value. If the NR resource allocation information is the actual value obtained based on the NR scheduling information, the NR resource allocation information may be a quantity of RBs actually used for NR transmission. If the NR resource allocation information is the preset value, the NR resource allocation information may be a preset quantity of resource blocks, such as one RB, for NR transmission.

NR AMPR (for example, the first AMPR), the NR AMPR is determined based on the NR scheduling information, the LTE resource allocation information, and one or more of an SIB message and higher layer signaling. The LTE resource allocation information may be an actual value obtained based on LTE scheduling information, or may be a preset value. If the LTE resource allocation information is the actual value obtained based on the LTE scheduling information, the LTE resource allocation information may be a quantity of resource blocks actually used for LTE transmission. If the LTE resource allocation information is the preset value, the LTE resource allocation information may be a preset quantity of resource blocks, such as one RB, for LTE transmission.

LTE power is calculated based on information indicated by both LTE physical layer signaling and/or higher layer signaling and is determined in consideration of impact of LTE AMPR. A specific method for determining the LTE power is, for example, calculating first LTE power based on the information indicated by both the LTE physical layer signaling and/or higher layer signaling, comparing the first LTE power with maximum transmit power Pcmax_LTE-AMPR on an LTE side, and determining the first LTE power as the LTE power if the first LTE power is less than or equal to Pcmax_LTE-AMPR, or determining Pcmax_LTE-AMPR as the LTE power if the first LTE power is greater than Pcmax_LTE-AMPR.

First NR power is calculated based on information indicated by both NR physical layer signaling and/or higher layer signaling and is determined in consideration of impact of NR AMPR. A specific method for determining the first NR power is, for example, calculating third NR power based on the information indicated by both the NR physical layer signaling and/or higher layer signaling, comparing the third NR power with maximum transmit power Pcmax_NR-AMPR on an NR side, and determining the third NR power as the first NR power if the third NR power is less than or equal to Pcmax_NR-AMPR, or determining Pcmax_NR-AMPR as the first NR power if the third NR power is greater than Pcmax_NR-AMPR.

Maximum DC transmit power is a parameter used to limit total power for LTE transmission and NR transmission in an LTE-NR DC scenario.

Second NR power is as follows. If a sum of LTE power and the first NR power is greater than maximum DC transmit power, the terminal device performs transmission at the second NR power. In this case, the second NR power is less than the first NR power.

Time domain resources that completely or partially overlap each other. Because an LTE cell and an NR cell may be synchronous or asynchronous, timing advance (TA) of the LTE cell and the NR cell may be different. In addition, there are different subcarrier spacings in the NR cell. For example, the subcarrier spacing in the NR cell is $15*2^n$ kilohertz (kHz). Therefore, a slot length in the NR cell is different from a slot length in the LTE cell. As a result, uplink transmission in the LTE cell and uplink transmission in the NR cell may completely or partially overlap each other in time domain.

The first resource allocation information may be preset or real-time LTE scheduling information, and indicates a resource allocation status on an LTE side. The preset LTE scheduling information is a preset value in the terminal device. The real-time LTE scheduling information is information received by the terminal device from the eNB.

The first NR power is power that may be used by the terminal device to send NR information to the gNB.

S220. The terminal device determines LTE power based on second AMPR, where the second AMPR is calculated based on LTE scheduling information and second resource allocation information, and the second resource allocation information is a preset value and is the same as or different from the first resource allocation information.

The second resource allocation information indicates a resource allocation status on an NR side. According to a communications protocol (38.213), the LTE unit in the terminal device cannot obtain information about the NR unit. Therefore, when calculating the LTE power, the terminal device cannot determine, based on real-time NR scheduling information, a resource allocated by the gNB to the NR unit. The terminal device needs to calculate the second AMPR based on preset NR scheduling information (that is, the second resource allocation information), and calculate the LTE power based on the second AMPR. The LTE power is power that is actually used by the terminal device to send LTE information to the eNB.

S230. When a sum of the first NR power and the LTE power is greater than maximum DC transmit power of the terminal device, the terminal device sends the LTE information to the first access device at the LTE power on time domain resources that completely or partially overlap each other, and the terminal device sends the NR information to the second access device at second NR power or skips sending the NR information, where the second NR power is less than the first NR power.

Because system time of cells corresponding different network devices is allowed to be asynchronous in a DC communications system, time domain resources scheduled by the eNB and the gNB may partially or completely overlap each other. For example, that the time domain resources partially overlap each other is, for example, that a subframe scheduled by the eNB and a transmission time interval (TTI) scheduled by the gNB overlap. That the time domain resources completely overlap each other is, for example, that a start position and an end position of a radio frame scheduled by the eNB are the same as a start position and an end position of a radio frame scheduled by the gNB. The foregoing example is merely an example for description, and the time domain resources that completely or partially overlap each other and that are described in this application are not limited thereto.

On the time domain resources that completely or partially overlap each other, if the sum of the first NR power and the LTE power is greater than the maximum transmit power of the terminal device, the terminal device normally sends the LTE information at the LTE power, and sends the NR information at the second NR power that is less than the first NR power or gives up sending the NR information. Therefore, a communication failure caused because calculated transmit power is greater than the maximum transmit power is avoided.

The LTE information may be one or more of service data, signaling, and a reference signal that are sent to the eNB, or may be other information transmitted by using the LTE access technology. The NR information may be one or more of service data, signaling, and a reference signal that are sent to the gNB, or may be other information transmitted by using the NR access technology.

In conclusion, the terminal device calculates the LTE power by using preset resource allocation information (that is, the first resource allocation information), and calculates the first NR power by using preset or real-time resource allocation information. In this way, when calculating the LTE power, the terminal device does not need to obtain the NR scheduling information, so that a communication failure caused because transmit power exceeds the maximum transmit power of the terminal device can be avoided on a premise that a communications protocol (for example, the protocol 38.213) is not violated.

Optionally, the method 200 further includes, when the sum of the first NR power and the LTE power is less than or equal to the maximum transmit power of the terminal device, the terminal device sends the NR information to the second access device at the first NR power on the time domain resources that completely or partially overlap each other, and sends the LTE information to the first access device at the LTE power.

On the time domain resources that completely or partially overlap each other, if the sum of the first NR power and the LTE power is less than or equal to the maximum transmit power of the terminal device, the terminal device may directly send the NR information at the first NR power.

Optionally, the first resource allocation information is obtained based on the LTE scheduling information, or the first resource allocation information is a preset value.

For example, when failing to obtain the LTE scheduling information when obtaining the first resource allocation information (that is, calculating resource allocation on an NR side), the terminal device may determine the resource allocation on the NR side based on preset first resource allocation information, and calculate the LTE power based on the resource allocation on the NR side and the first AMPR. In this way, the communication failure caused because the transmit power exceeds the maximum transmit power of the terminal device can be avoided. For another example, when successfully obtaining the LTE scheduling information when obtaining the first resource allocation information (that is, calculating resource allocation on an NR side), the terminal device may obtain the first resource allocation information based on the LTE scheduling information, to more accurately calculate the first NR power.

This application further provides another power determining method. As shown in FIG. 3, the method 300 includes the following steps.

S310. A terminal device determines LTE power based on third AMPR, where the third AMPR is calculated based on LTE scheduling information and third resource allocation information, and the terminal device accesses a first access device by using an LTE access technology, and accesses a second access device by using an NR access technology.

S320. The terminal device sends LTE information at the LTE power.

In the method 300, the third AMPR is a value obtained based on an AMPR mechanism. The third AMPR may be the LTE AMPR described in the method 200. The third resource allocation information may be a preset or real-time value, and indicates a resource allocation status on an NR side. The preset NR scheduling information is a preset value in the terminal device. The real-time value is a value obtained by the terminal device based on NR scheduling information received from the gNB. Meanings of the terminal device, the first access device, and the second access device are the same as the meanings of the corresponding nouns in the method 200. Details are not described herein again.

In the foregoing solution, the terminal device may obtain the third resource allocation information when calculating the LTE power. The third resource allocation information indicates the resource allocation on the NR side. In this way, the terminal device may calculate the LTE power based on resource allocation on the NR side, so that a communication failure caused because transmit power exceeds maximum transmit power of the terminal device can be avoided.

Optionally, the third resource allocation information is obtained based on NR scheduling information, and the method 300 further includes the following.

The terminal device obtains the NR scheduling information at a first moment. The first moment is earlier than or equal to a preset calculation start moment of the LTE power.

If the terminal device obtains the NR scheduling information before the calculation start moment of the LTE power, the terminal device may determine the third resource allocation information based on the NR scheduling information, and calculate the LTE power. If the terminal device does not obtain the NR scheduling information at the calculation start moment of the LTE power, the terminal device first calculates the LTE power based on preset third resource allocation information. Then, if the terminal device obtains the NR scheduling information at a preset update start moment of the LTE power, the terminal device obtains real-time third resource allocation information based on the NR scheduling information, and recalculates the LTE power. In this way, precision for calculating the LTE power can be improved on a premise that the LTE information is ensured to be sent.

Optionally, the third resource allocation information is obtained based on NR scheduling information, and the method 300 further includes the following.

The terminal device obtains the NR scheduling information at a second moment. The second moment is later than a preset calculation start moment of the LTE power and is earlier than or equal to a preset update start moment of the LTE power. The terminal device determines, based on the LTE scheduling information and a preset value at the calculation start moment of the LTE power, LTE power that is not updated.

If the terminal device does not obtain the NR scheduling information before the calculation start moment of the LTE power, the terminal device may calculate an AMPR value based on the preset value and the LTE scheduling information, and calculate, based on the AMPR value, the LTE power that is not updated. Then, if the terminal device obtains the NR scheduling information at the preset update start moment of the LTE power, the terminal device obtains real-time third resource allocation information based on the NR scheduling information, and recalculates the LTE power. In this way, precision for calculating the LTE power can be improved on a premise that the LTE information is ensured to be sent.

Optionally, the method 300 further includes the terminal device generates an updated PHR based on the LTE scheduling information and the third resource allocation information. The second moment is earlier than or equal to a preset update start moment of the PHR, and the terminal device generates, before the second moment based on the LTE power that is not updated, a PHR that is not updated. The terminal device sends the updated PHR.

After calculating the LTE power that is not updated, the terminal device may generate, based on the LTE power that is not updated, the PHR that is not updated. If a moment at which the terminal device obtains the NR scheduling information is earlier than or equal to the preset update start moment of the PHR, the terminal device may first calculate real-time third AMPR based on the NR scheduling information, calculate updated LTE power based on the real-time third AMPR, and then regenerate the updated PHR based on the updated LTE power, so that precision of the PHR can be improved.

It should be noted that, the update start moment of the PHR may be the same as or different from the update start moment of the LTE power.

Optionally, the third resource allocation information is a preset value, and before S320, the method 300 further includes the following.

The terminal device obtains NR scheduling information at a third moment. The third moment is later than a preset calculation start moment of the LTE power and a preset update start moment of the LTE power.

If the terminal device obtains the NR scheduling information after the update start moment of the LTE power, there is no time for the terminal device to update the LTE power. The terminal device may transmit a signal at the LTE power calculated based on preset third resource allocation information, to ensure that the LTE information can be normally transmitted.

Figure 4:
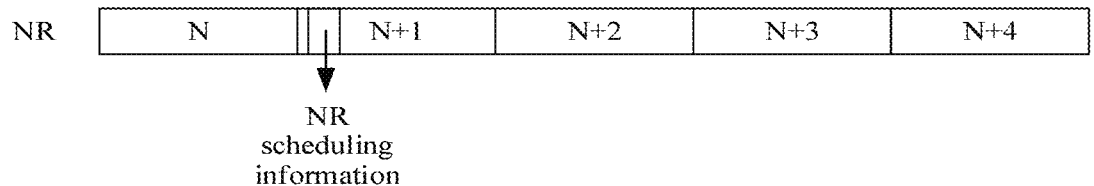
FIG. 4 is a schematic diagram of still another power determining method according to this application.

FIG. 4 is a schematic diagram of still another power determining method according to this application. As shown in FIG. 4, an eNB and a gNB separately schedule, by using a physical downlink control channel (PDCCH), a terminal device to perform uplink transmission. Time domain resources (which are subframes shown in the figure) scheduled by the eNB and the gNB completely overlap each other. An LTE unit of the terminal device sends LTE scheduling information to an NR unit in a subframe N (N is an integer greater than or equal to 0), so that the NR unit calculates an AMPR value, and calculates NR transmit power based on the AMPR value. The NR unit of the terminal device sends NR scheduling information to the LTE unit in a subframe N+1, so that the LTE unit calculates an AMPR value, and calculates LTE transmit power based on the AMPR value. Because the LTE unit obtains the NR scheduling information before a calculation start moment of the LTE transmit power, the LTE unit may calculate the LTE transmit power based on real-time NR scheduling information, and then generate a PHR based on the LTE transmit power and report the PHR.

Figure 5:
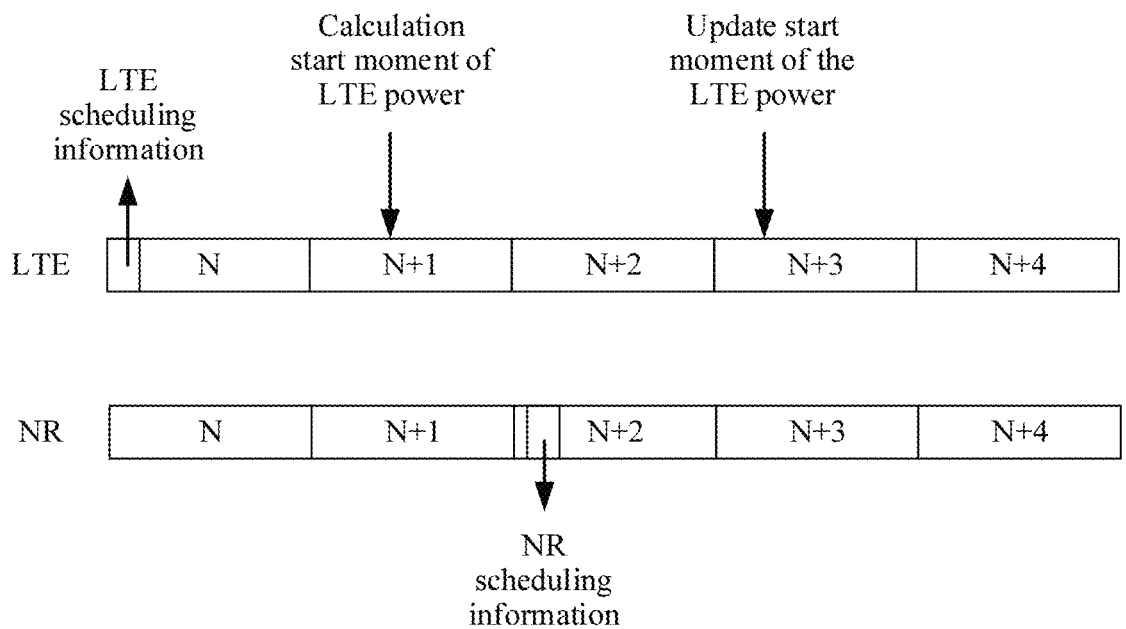
FIG. 5 is a schematic diagram of yet another power determining method according to this application.

FIG. 5 is a schematic diagram of yet another power determining method according to this application. As shown in FIG. 5, an eNB and a gNB separately schedule, through a PDCCH, a terminal device to perform uplink transmission. Time domain resources (which are subframes shown in the figure) scheduled by the eNB and the gNB completely overlap each other. An LTE unit of the terminal device sends LTE scheduling information to an NR unit in a subframe N (N is an integer greater than or equal to 0), so that the NR unit calculates an AMPR value, and calculates NR transmit power based on the AMPR value.

The NR unit of the terminal device sends NR scheduling information to the LTE unit in a subframe N+2, so that the LTE unit calculates an AMPR value. Because the LTE unit does not obtain the NR scheduling information before a calculation start moment of LTE transmit power, the LTE unit may calculate the LTE transmit power based on preset NR scheduling information (which may also be referred to as preset resource allocation information). Then the LTE unit obtains the NR scheduling information in the subframe N+2. Because the subframe N+2 is before an update start moment of the LTE transmit power of the LTE unit, there is still time for the LTE unit to recalculate the LTE power. Therefore, the LTE unit may calculate an AMPR value based on real-time NR scheduling information (that is, the NR scheduling information obtained in the subframe N+2), calculate more accurate LTE power based on the AMPR value, and perform transmission based on the updated LTE power in a subframe N+4.

Because a PHR needs to be generated based on the LTE power, a calculation moment of the PHR is later than a calculation moment of the LTE power, and an update moment of the PHR is later than an update moment of the LTE power. To update the PHR, the NR scheduling information needs to be obtained in advance. In this application, the update start moment of the PHR is a latest moment for obtaining the NR scheduling information required for updating the PHR. In other words, if a moment for obtaining the NR scheduling information is earlier than the update start moment of the PHR, the terminal device may update the PHR based on the NR scheduling information. If the moment for obtaining the NR scheduling information is later than the update start moment of the PHR, there may be time for the terminal device to update the LTE power, but there is no time for the terminal device to update the PHR.

If a moment at which the LTE unit obtains the NR scheduling information is later than the calculation start moment of the LTE power, the LTE unit calculates the LTE power based on the preset NR scheduling information, and generates the PHR based on the LTE power. Then the LTE unit obtains the real-time NR scheduling information before the update start moment (for example, a first moment) of the LTE power. If the first moment is earlier than the moment (that is, a PHR update moment) for obtaining the NR scheduling information required for updating the PHR, the LTE unit updates and reports the PHR. If the first moment is later than the PHR update moment, the LTE unit does not update the PHR, but reports a previously generated PHR, to ensure normal scheduling of the eNB.

Figure 6:
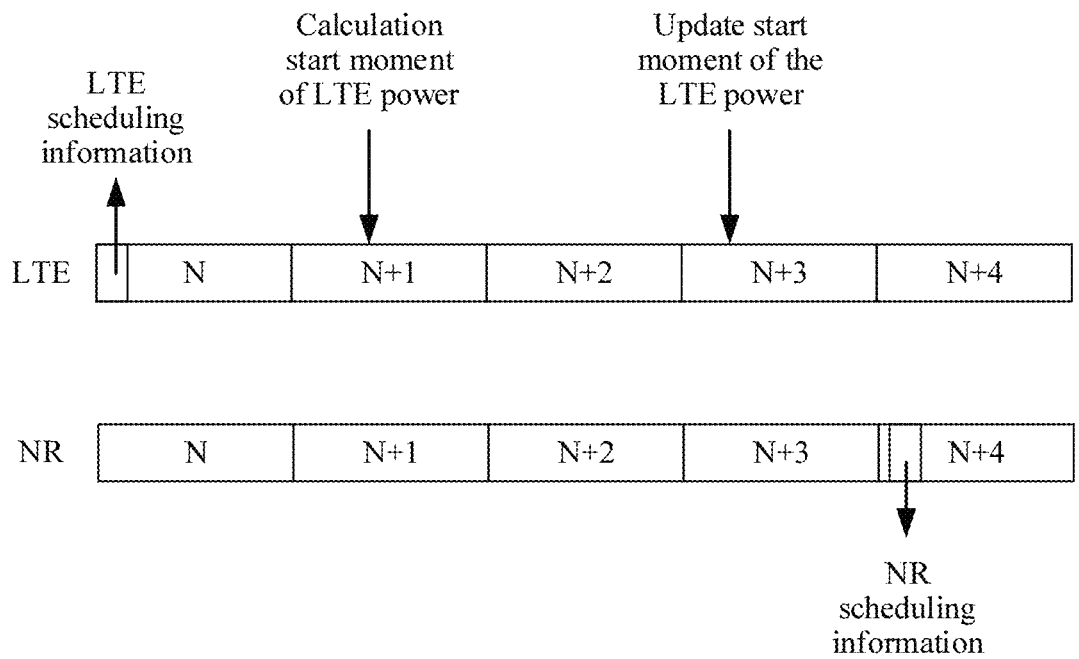
FIG. 6 is a schematic diagram of still yet another power determining method according to this application.

FIG. 6 is a schematic diagram of still yet another power determining method according to this application. As shown in FIG. 6, an eNB and a gNB separately schedule, through a PDCCH, a terminal device to perform uplink transmission. Time domain resources (which are subframes shown in the figure) scheduled by the eNB and the gNB partially overlap each other. An LTE unit of the terminal device sends LTE scheduling information to an NR unit in a subframe N (N is an integer greater than or equal to 0), so that the NR unit calculates an AMPR value, and calculates NR transmit power based on the AMPR value.

The NR unit of the terminal device sends NR scheduling information to the LTE unit in a subframe N+4, so that the LTE unit calculates an AMPR value. Because the LTE unit does not obtain the NR scheduling information before a calculation start moment of LTE transmit power, the LTE unit may calculate the LTE transmit power based on preset NR scheduling information (which may also be referred to as preset resource allocation information). Then the LTE unit obtains the NR scheduling information in the subframe N+4. Because the subframe N+4 is after an update start moment of the LTE transmit power of the LTE unit, there is no time for the LTE unit to recalculate the LTE power. Therefore, the LTE unit may send the LTE information at the previously calculated LTE power, generate a PHR based on the LTE power, and report the PHR.

The foregoing describes in detail examples of the power determining method provided in this application. It can be understood that, to implement the foregoing functions, a power determining apparatus includes a corresponding hardware structure and/or software module for performing the functions. A person skilled in the art should be easily aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the power determining apparatus may be divided into functional units based on the foregoing method examples. For example, each function may be divided into functional units, or two or more functions may be integrated into one processing unit. The integrated unit may be implemented in a form of hardware, or may be implemented in a form of a software functional unit. It needs to be noted that, in this application, the unit division is an example, and is merely logical function division. During actual implementation, there may be another division manner.

Figure 7:
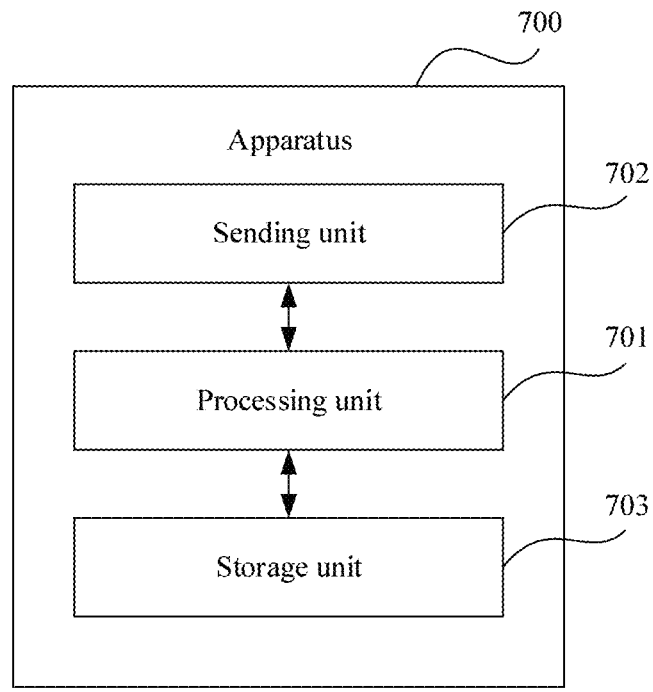
FIG. 7 is a schematic diagram of a power determining apparatus according to this application.

When the integrated unit is used, FIG. 7 is a possible schematic diagram of a power determining apparatus according to this application. The apparatus 700 includes a processing unit 701 and a sending unit 702. The processing unit 701 is configured to control the apparatus 700 to perform the steps of the power determining method shown in FIG. 2. The processing unit 701 may further be configured to perform another process of the technology described in this specification. The apparatus 700 may further include a storage unit 703. The storage unit 703 is configured to store program code and data of the apparatus 700.

For example, the processing unit 701 is configured to determine first NR power based on first AMPR, where the first AMPR is calculated based on first resource allocation information and NR scheduling information, and the apparatus 700 accesses a first access device by using an LTE access technology, and accesses a second access device by using an NR access technology, and determine LTE power based on second AMPR, where the second AMPR is calculated based on LTE scheduling information and second resource allocation information, and the second resource allocation information is a preset value.

The processing unit 701 is further configured to control the sending unit 702 to, when a sum of the first NR power and the LTE power is greater than maximum DC transmit power of the apparatus 700, send LTE information to the first access device at the LTE power on time domain resources that completely or partially overlap each other, and send NR information to the second access device at second NR power or skip sending NR information. The second NR power is less than the first NR power.

The processing unit 701 may be a processor or a controller, such as a central processing unit (CPU), a general purpose processor, a digital signal processor (DSP), an application-specific integrated circuit (ASIC), a field-programmable gate array (FPGA) or another programmable logic component, a transistor logic device, a hardware component, or any combination thereof. The processing unit 701 may implement or execute various example logical blocks, modules, and circuits described with reference to content disclosed in this application. The processor may alternatively be a combination for implementing a computing function, for example, a combination including one or more microprocessors, or a combination of a DSP and a microprocessor. The sending unit 702 is, for example, a transceiver, and the storage unit 703 may be a memory.

Figure 8:
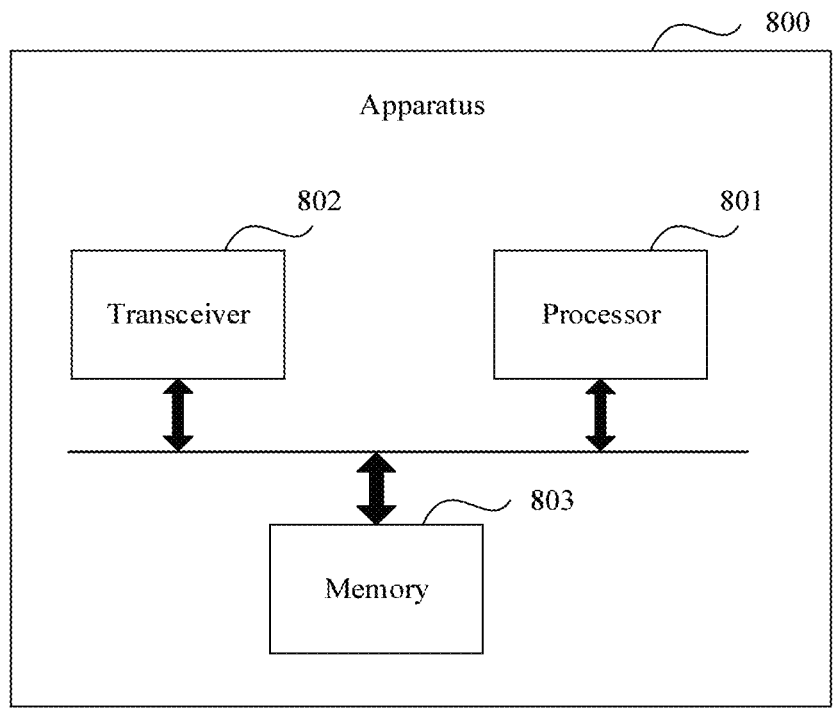
FIG. 8 is a schematic diagram of another power determining apparatus according to this application.

When the processing unit 701 is a processor, the sending unit 702 is a transceiver, and the storage unit 703 is a memory, the power determining apparatus in this application may be an apparatus shown in FIG. 8.

Referring to FIG. 8, the apparatus 800 includes a processor 801, a transceiver 802, and a memory 803 (which is optional). The processor 801, the transceiver 802, and the memory 803 may communicate with each other by using an internal connection path, to transfer a control signal and/or a data signal.

It may be clearly understood by a person skilled in the art that, for the purpose of convenient and brief description, for a detailed working process of the foregoing apparatus and units, refer to a corresponding process in the foregoing method embodiments, and details are not described herein again.

The power determining apparatus provided in this application calculates the LTE power by using preset resource allocation information (that is, the first resource allocation information), and calculates the first NR power by using preset or real-time resource allocation information. In this way, when calculating the LTE power, the power determining apparatus does not need to obtain the NR scheduling information, so that a communication failure caused because transmit power exceeds the maximum transmit power of the apparatus can be avoided on a premise that a communications protocol (for example, the protocol 38.213) is not violated.

Figure 9:
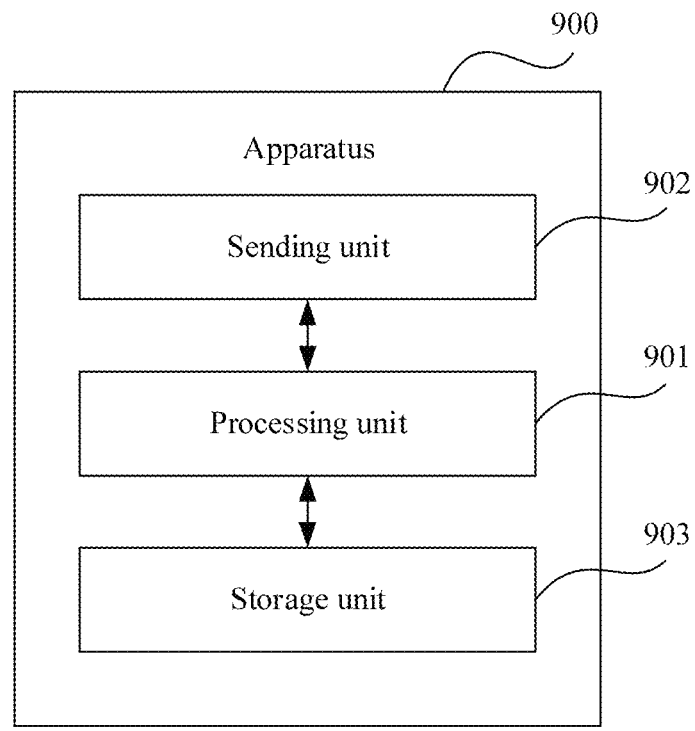
FIG. 9 is a schematic diagram of still another power determining apparatus according to this application.

When the integrated unit is used, FIG. 9 is a possible schematic diagram of a power determining apparatus according to this application. The apparatus 900 includes a processing unit 901 and a sending unit 902. The processing unit 901 is configured to control the apparatus 900 to perform the steps of the power determining method shown in FIG. 3. The processing unit 901 may further be configured to perform another process of the technology described in this specification. The apparatus 900 may further include a storage unit 903. The storage unit 903 is configured to store program code and data of the apparatus 900.

For example, the processing unit 901 is configured to determine LTE power based on third AMPR. The third AMPR is calculated based on LTE scheduling information and third resource allocation information. The apparatus 900 accesses a first access device by using an LTE access technology, and accesses a second access device by using an NR access technology.

The processing unit 901 is further configured to control the sending unit 902 to send LTE information at the LTE power.

The processing unit 901 may be a processor or a controller, such as a CPU, a general-purpose processor, a DSP, an ASIC, a FPGA or another programmable logic component, a transistor logic device, a hardware component, or any combination thereof. The processing unit 901 may implement or execute various example logical blocks, modules, and circuits described with reference to content disclosed in this application. The processor may alternatively be a combination for implementing a computing function, for example, a combination including one or more microprocessors, or a combination of a DSP and a microprocessor. The sending unit 902 and a receiving unit 903 are, for example, a transceiver, and the storage unit may be a memory.

Figure 10:
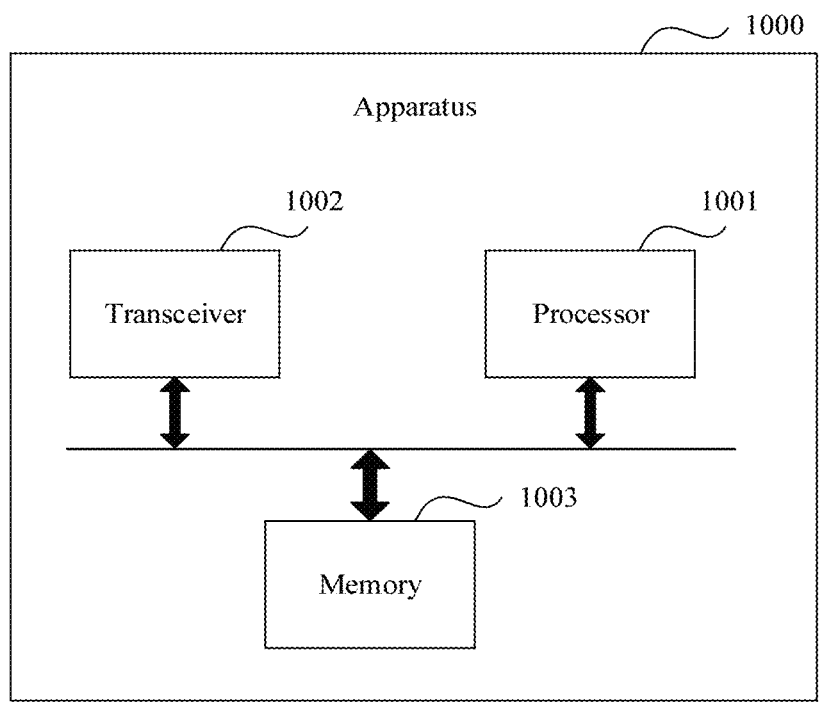
FIG. 10 is a schematic diagram of yet another power determining apparatus according to this application.

When the processing unit 901 is a processor, the sending unit 902 and the receiving unit 903 are a transceiver, and the storage unit is a memory, the power determining apparatus in this application may be an apparatus shown in FIG. 10.

Referring to FIG. 10, the apparatus 1000 includes a processor 1001, a transceiver 1002, and a memory 1003 (which is optional). The processor 1001, the transceiver 1002, and the memory 1003 may communicate with each other by using an internal connection path, to transfer a control signal and/or a data signal.

It may be clearly understood by a person skilled in the art that, for the purpose of convenient and brief description, for a detailed working process of the foregoing apparatus and units, refer to a corresponding process in the foregoing method embodiments, and details are not described herein again.

The power determining apparatus provided in this application may obtain the third resource allocation information when calculating the LTE power. The third resource allocation information indicates the resource allocation on the NR side. In this way, the power determining apparatus may calculate the LTE power based on resource allocation on the NR side, so that a communication failure caused because transmit power exceeds maximum transmit power of the apparatus can be avoided.

The apparatus embodiments completely correspond to the method embodiments. For example, a communications unit performs an obtaining step in the method embodiments, and all steps other than the obtaining step and the sending step may be performed by the processing unit or the processor. For a function of a specific unit, refer to a corresponding method embodiment. Details are not described herein again.

In the embodiments of this application, sequence numbers of the foregoing processes do not mean execution sequences. The execution sequences of the processes should be determined based on functions and internal logic of the processes, and should not be construed as any limitation on the implementation processes of this application.

In addition, the term "and/or" describes an association relationship between associated objects, and represents that three relationships may exist. For example, A and/or B may represent the following three cases only A exists, both A and B exist, and only B exists. In addition, the character "/" in this specification usually indicates an "or" relationship between the associated objects.

The method or algorithm steps described with reference to the content disclosed in this application may be implemented by hardware, or may be implemented by a processor by executing a software instruction. The software instruction may include a corresponding software module. The software module may be stored in a random-access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or functions according to this application are generated. The computer may be a general-purpose computer, a special-purpose computer, a computer network, or another programmable apparatus. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement or improvement made based on technical solutions of this application shall fall within the protection scope of this application.

What is claimed is:

1. A power determining method, implemented by a terminal device, wherein the power determining method comprises:
   calculating a first additional maximum power reduction (AMPR) based on first resource allocation information and New Radio (NR) scheduling information;
   determining a first NR power based on the first AMPR;
   accessing a first access device using a Long-Term Evolution (LTE) access technology;

accessing a second access device using an NR access technology;
calculating a second AMPR based on LTE scheduling information and second resource allocation information, wherein the second resource allocation information is a preset value;
determining an LTE power based on the second AMPR; and
when a sum of the first NR power and the LTE power is greater than a maximum dual connectivity (DC) transmit power of the terminal device, sending LTE information to the first access device at the LTE power on time domain resources that at least partially overlap each other and performing one of sending NR information to the second access device at second NR power or skipping sending the NR information, wherein the second NR power is less than the first NR power.

2. The power determining method of claim 1, further comprising when the sum of the first NR power and the LTE power is less than or equal to the maximum DC transmit power, sending the NR information to the second access device at the first NR power on the time domain resources that at least partially overlap each other and sending the LTE information to the first access device at the LTE power.

3. The power determining method of claim 1, further comprising obtaining the first resource allocation information based on the LTE scheduling information.

4. The power determining method of claim 1, further comprising when the sum of the first NR power and the first LTE power is less than or equal to the maximum DC transmit power, sending the NR information to the second access device at the first NR power on the time domain resources that partially overlap each other and sending the LTE information to the first access device at the first LTE power.

5. The power determining method of claim 1, wherein the first resource allocation information is the preset value.

6. A power determining method, implemented by a terminal device, wherein the power determining method comprises:
calculating a first additional maximum power reduction (AMPR) based on Long-Term Evolution (LTE) scheduling information and first resource allocation information;
determining a first LTE power based on the first AMPR;
accessing a first access device using an LTE access technology;
accessing a second access device using a New Radio (NR) access technology;
sending LTE information at the first LTE power;
obtaining NR scheduling information at a first moment, wherein the first moment is later than a preset calculation start moment of the first LTE power and is earlier than or at a first preset update start moment of the first LTE power;
determining a second LTE power that is not updated based on the LTE scheduling information and a preset value at the preset calculation start moment of the first LTE power; and
obtaining the first resource allocation information based on the NR scheduling information.

7. The power determining method of claim 6, further comprising:
obtaining NR scheduling information at a second moment, wherein the second moment is earlier than or at a preset calculation start moment of the first LTE power; and
obtaining the first resource allocation information based on the NR scheduling information.

8. The power determining method of claim 6, further comprising:
generating a power headroom report (PHR) before the first moment based on the first LTE power that is not updated, wherein the first moment is earlier than or at a second preset update start moment of the PHR;
generating an updated PHR based on the first LTE power; and
sending the updated PHR.

9. A power determining method, implemented by a terminal device, wherein the power determining method comprises:
calculating a first additional maximum power reduction (AMPR) based on Long-Term Evolution (LTE) scheduling information and first resource allocation information, wherein the first resource allocation information is a preset value;
determining a first LTE power based on the first AMPR;
accessing a first access device using an LTE access technology;
accessing a second access device using a New Radio (NR) access technology;
obtaining NR scheduling information at a first moment, wherein the first moment is later than a preset calculation start moment of the first LTE power and a preset update start moment of the first LTE power; and
sending LTE information at the first LTE power.

10. A power determining apparatus, comprising:
a processor configured to:
calculate first additional maximum power reduction (AMPR) based on first resource allocation information and New Radio (NR) scheduling information;
determine first NR power based on the first AMPR;
access a first access device using a Long-Term Evolution (LTE) access technology;
access a second access device using an NR access technology;
calculate second AMPR based on LTE scheduling information and second resource allocation information, wherein the second resource allocation information is a preset value; and
determine an LTE power based on second AMPR; and
a transmitter coupled to the processor and configured to, when a sum of the first NR power and the LTE power is greater than maximum dual connectivity (DC) transmit power of the apparatus, send LTE information to the first access device at the LTE power on time domain resources that at least partially overlap each other and perform one of send NR information to the second access device at second NR power or skip sending the NR information, wherein the second NR power is less than the first NR power.

11. The power determining apparatus of claim 10, wherein the transmitter is further configured to when the sum of the first NR power and the LTE power is less than or equal to the maximum DC transmit power, send the NR information to the second access device at the first NR power on the time domain resources that at least partially overlap each other and send the LTE information to the first access device at the LTE power.

12. The power determining apparatus of claim 10, wherein the processor is further configured to obtain the first resource allocation information based on the LTE scheduling information.

13. The power determining apparatus of claim 10, wherein the transmitter is further configured to, when the sum of the first NR power and the first LTE power is less than or equal to the maximum DC transmit power, send the NR information to the second access device at the first NR power on the time domain resources that partially overlap each other and send the LTE information to the first access device at the first LTE power.

14. The power determining apparatus of claim 10, wherein the first resource allocation information is the preset value.

15. A power determining apparatus, comprising:
a processor configured to:
calculate a first additional maximum power reduction (AMPR) based on Long-Term Evolution (LTE) scheduling information and first resource allocation information;
determine a first LTE power based on the first AMPR;
access a first access device using an LTE access technology;
access a second access device using a New Radio (NR) access technology;
obtain NR scheduling information at a first moment, wherein the first moment is later than a preset calculation start moment of the first LTE power and is earlier than or at a first preset update start moment of the first LTE power;
determine a second LTE power that is not updated based on the LTE scheduling information and a preset value at the preset calculation start moment of the first LTE power; and
obtain the first resource allocation information based on the NR scheduling information; and
a transmitter coupled to the processor and configured to send LTE information at the first LTE power.

16. The power determining apparatus of claim 15, wherein the processor is further configured to:
obtain NR scheduling information at a first second moment, wherein the first second moment is earlier than or at a preset calculation start moment of the first LTE power; and
obtain the first resource allocation information based on the NR scheduling information.

17. The power determining apparatus of claim 15, wherein the processor is further configured to:
generate a power headroom report (PHR) before the first moment based on the first LTE power that is not updated, wherein the first moment is earlier than or equal to a second preset update start moment of the PHR; and
generate an updated PHR based on the first LTE power, wherein the transmitter is further configured to send the updated PHR.

18. A power determining apparatus, comprising:
a processor configured to:
calculate a first additional maximum power reduction (AMPR) based on Long-Term Evolution (LTE) scheduling information and first resource allocation information wherein the first resource allocation information is a preset value;
determine a first LTE power based on the first AMPR;
access a first access device using an LTE access technology;
access a second access device using a New Radio (NR) access technology; and
obtain NR scheduling information at a first moment, wherein the first moment is later than a preset calculation start moment of the first LTE power and a preset update start moment of the first LTE power; and
a transmitter coupled to the processor and configured to send LTE information at the first LTE power.

* * * * *